(12) United States Patent
Bohli et al.

(10) Patent No.: US 10,498,535 B2
(45) Date of Patent: Dec. 3, 2019

(54) METHOD AND SYSTEM FOR VERIFYING INFORMATION OF A DATA ITEM IN A PLURALITY OF DIFFERENT DATA ITEMS

(71) Applicant: NEC Laboratories Europe GmbH, Heidelberg (DE)

(72) Inventors: Jens-Matthias Bohli, Leimen (DE); Ghassan Karame, Heidelberg (DE); Frederik Armknecht, Worms (DE)

(73) Assignee: NEC CORPORATION, Tokyo (JP)

( * ) Notice: Subject to any disclaimer, the term of this patent is extended or adjusted under 35 U.S.C. 154(b) by 12 days.

(21) Appl. No.: 15/550,795

(22) PCT Filed: Feb. 16, 2015

(86) PCT No.: PCT/EP2015/053242
§ 371 (c)(1),
(2) Date: Aug. 14, 2017

(87) PCT Pub. No.: WO2016/131473
PCT Pub. Date: Aug. 25, 2016

(65) Prior Publication Data
US 2018/0026791 A1    Jan. 25, 2018

(51) Int. Cl.
*H04L 9/32* (2006.01)
*G06F 16/13* (2019.01)
(Continued)

(52) U.S. Cl.
CPC .......... *H04L 9/3239* (2013.01); *G06F 16/137* (2019.01); *G06F 16/1748* (2019.01);
(Continued)

(58) Field of Classification Search
CPC ......... G06F 17/30097; G06F 17/30156; G06F 17/30194; G06F 21/30; G06F 21/602; G06F 21/6218; G06F 21/64; H04L 9/3239
See application file for complete search history.

(56) References Cited

U.S. PATENT DOCUMENTS 8,726,034 B2 * 5/2014 Papamanthou ......... G06F 21/64
713/189
9,372,757 B2 * 6/2016 Cantwell ............. G06F 11/1451
(Continued)

OTHER PUBLICATIONS

Prekumar et al. "Authentic Data Publication over the Internet", Journal of Computer Security, vol. 11, No. 3, Apr. 2003 (Year: 2003).*

(Continued)

*Primary Examiner* — Hee K Song
(74) *Attorney, Agent, or Firm* — Leydig, Voit & Mayer, Ltd.

(57) ABSTRACT

A method for verifying information of a first data item in a plurality of different data items stored on a server includes a) generating a hash tree, b) computing an authentication path for the first data item based on a recomputation of the hash tree, wherein an authentication path includes all siblings of tree nodes from the first data item to a root of the hash tree, c) recomputing the root-hash based on the first data item and a computed authentication path of the first data item and comparing the recomputed root-hash with the root-hash of the hash-tree of step a), d) determining a side element in leaves or a tree level above of the hash tree and its authentication path, and e) verifying the authentication path of the side element.

9 Claims, 3 Drawing Sheets

(51) Int. Cl.
  *G06F 21/30* (2013.01)
  *H04L 29/06* (2006.01)
  *G06F 21/62* (2013.01)
  *G06F 21/60* (2013.01)
  *G06F 21/64* (2013.01)
  *G06F 16/182* (2019.01)
  *G06F 16/174* (2019.01)
  *H04L 29/08* (2006.01)

(52) U.S. Cl.
  CPC ............ *G06F 16/182* (2019.01); *G06F 21/30* (2013.01); *G06F 21/602* (2013.01); *G06F 21/6218* (2013.01); *G06F 21/64* (2013.01); *H04L 29/06755* (2013.01); *H04L 63/0281* (2013.01); *H04L 63/0457* (2013.01); *H04L 63/061* (2013.01); *H04L 63/12* (2013.01); *H04L 67/1097* (2013.01)

(56) References Cited

U.S. PATENT DOCUMENTS

| | | | | |
|---|---|---|---|---|
| 2001/0034839 A1* | 10/2001 | Karjoth | ............... | H04L 9/3236 713/190 |
| 2014/0108723 A1* | 4/2014 | Nowoczynski | ..... | G06F 12/0866 711/113 |
| 2014/0245020 A1* | 8/2014 | Buldas | ................... | G06F 21/64 713/177 |
| 2016/0098723 A1* | 4/2016 | Feeney | ............. | G06Q 20/4016 705/75 |
| 2018/0025167 A1* | 1/2018 | Bohli | ................. | G06F 21/6218 713/193 |

OTHER PUBLICATIONS

Premkumar Devanbu et al: "Authentic Data Publication over the Internet", Journal of Computer Security, vol. 11, No. 3, Apr. 1, 2003 (Apr. 1, 2003), XP055219881.

Charles Martel et al: "A General Model for Authenticated Data Structures", Algorithmica., vol. 39, No. 1, Jan. 27, 2004 (Jan. 27, 2004), pp. 21-41, XP055220357.

Roberto Tamassia: "Authenticated Data Structures" In: "Advances in Communication Networking:: 20th EUNICE/IFIP EG 6.2, 6.6 International Workshop, Rennes, France, Sep. 1-5, 2014, Revised Selected Papers", Sep. 16, 2003 (Sep. 16, 2003), Springer Verlag, DE 032548, XP055220055.

Michael Szydlo: "Recent Improvements in the Efficient Use of Merkle Trees: Additional Options for the Long Term", May 10, 2004 (May 10, 2004), XP055218992.

Anonymous: "Tiger (cryptography)—Wikipedia, the free encyclopedia", Dec. 15, 2014 (Dec. 15, 2014), XP055220933.

* cited by examiner

METHOD AND SYSTEM FOR VERIFYING INFORMATION OF A DATA ITEM IN A PLURALITY OF DIFFERENT DATA ITEMS

CROSS REFERENCE TO RELATED APPLICATIONS

This application is a U.S. National Stage Application under 35 U.S.C. § 371 of International Application No. PCT/EP2015/053242 filed on Feb. 16, 2015. The International Application was published in English on Aug. 25, 2016 as WO 2016/131473 A1 under PCT Article 21(2).

FIELD

The present invention relates to a method for verifying information of a data item in a plurality of different data items, preferably stored on a server like a cloud or the like. The present invention further relates to a system for verifying information of a data item in a plurality of different data items, preferably stored on a server like a cloud or the like.

BACKGROUND

Cloud storage is receiving increasing attention and importance recently. Cloud storage offers their users cost-effective, convenient and highly available storage services. Conventional clouds rely on cost-effective techniques such as data compression and data deduplication in order to save storage costs for the cloud. Data deduplication is beneficial as it significantly reduces the costs of storage. However, cloud users do not benefit from this deduplication, since deduplication is usually performed by the cloud itself. In other words users are usually being charged the same price, irrespective whether their data has been deduplicated by the cloud. This is a significant disadvantage for the users since users who are storing popular files which are usually deduplicated by the cloud storage should not be charged the same amount for storing non-deduplicated content.

In the non-patent literature of:

Pasquale Puzio, Refik Molva, Melek Onen and Sergio Loureiro. *ClouDedup: Secure Deduplication with Encrypted Data for Cloud Storage, Proceedings of IEEE CloudCom* 2013, A Secure Data Deduplication Scheme for Cloud Storage, Jan Stanek, Alessandro Sorniotti, Elli Androulaki, and Lukas Kenc, Proceedings of Financial Cryptography and Data Security, 2014, Boosting Efficiency and Security in Proof of Ownership for Deduplication, Roberto Di Pietro, Alessandro Sorniotti, Proceedings of ASIACCS 2012, and Mihir Bellare and Sriram Keelveedhi, Thomas Ristenpart, DupLESS: Server-Aided Encryption for Deduplicated Storage, Proceedings of Usenix Security 2013, techniques are disclosed for performing deduplication over encrypted data or for a construction for a proof of ownership to attest that a user indeed possesses a file which is deduplicated by a cloud for example. These conventional techniques are directed to increase the profitability of clouds by allowing the cloud service provider to save on his storage costs.

However one of the disadvantages is, that these techniques are not transparent for the users of a cloud storage provider. A further disadvantage is, that such a cloud storage is costly for the users. An even further disadvantage is that users cannot verify if they are the only user of an uploaded file, or if other users also have uploaded the same file.

SUMMARY

In an embodiment, the present invention provides a method for verifying information of a first data item in a plurality of different data items stored on a server. The method includes a) generating a hash tree from the plurality of different data items, such that the plurality of different data items form leaves of the hash tree and such that non-leaf nodes are computed by hashing data items of their respective child nodes, wherein when computing a root-hash at least a distance between a root node and leaf-nodes is included into a hashing; b) computing an authentication path for the first data item based on a recomputation of the hash tree, wherein the authentication path comprises all siblings of tree nodes from the first data item to a root of the hash tree; c) recomputing the root-hash based on the first data item and the computed authentication path of the first data item and comparing the recomputed root-hash with the root-hash of the hash-tree of step a); d) determining a side element in leaves or a tree level above of the hash tree and its authentication path; and e) verifying the authentication path of the side element. Based on the result of step e), a number of data items of the plurality of different data items is determined and wherein a membership of the first data item to the plurality of different data items is determined based on the result of step c).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
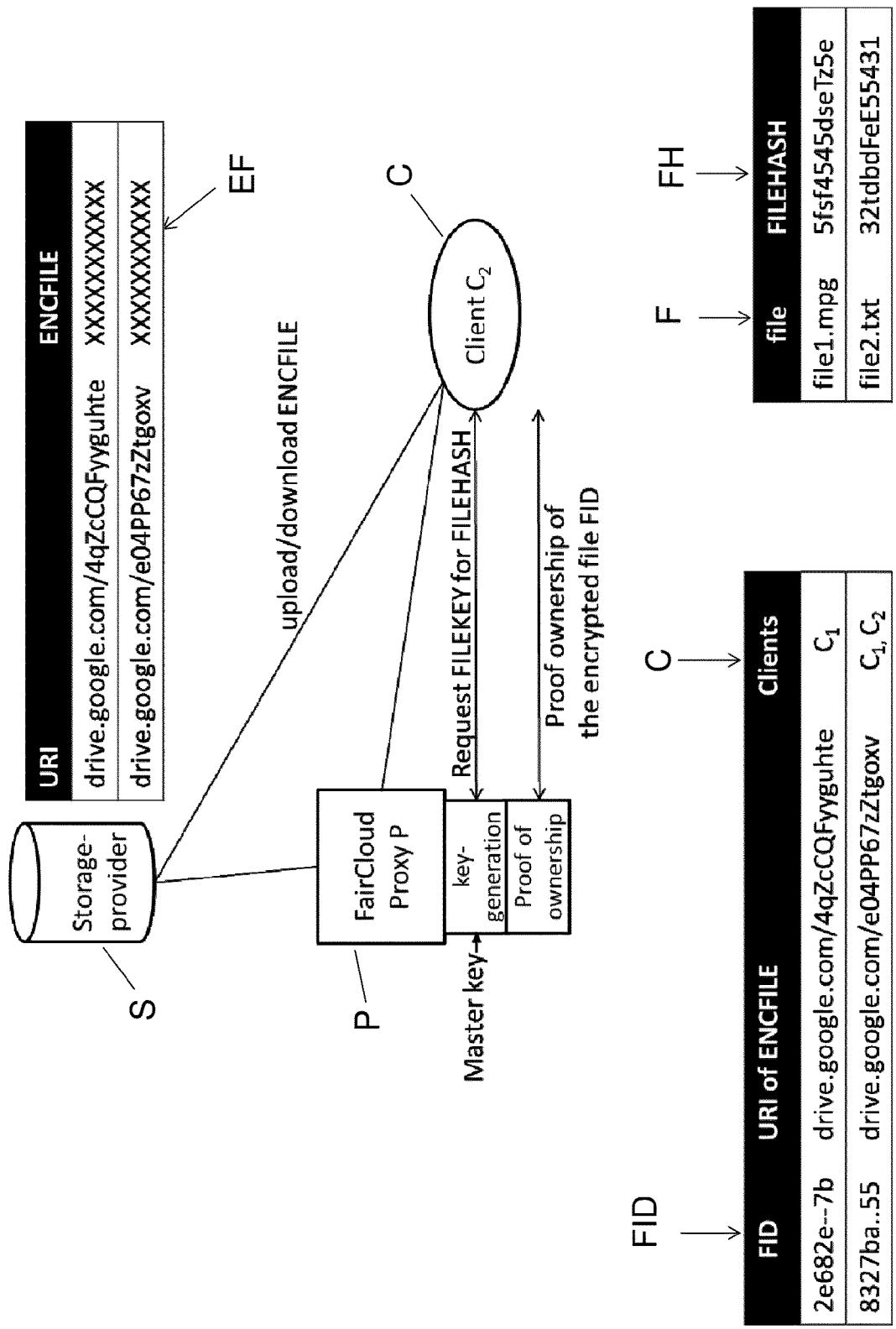
FIG. 1 shows a system for verifying information according to a first embodiment of the present invention.

Although applicable to any kind of storage in general, embodiments of the present invention will be described with regard to cloud storage, and in particular, shared or deduplicated files stored on the cloud.

Although applicable to any kind of information to be verified of a data item, embodiments of the present invention will be described with regard storage costs of a data item.

Embodiments of the present invention provide methods and systems for verifying information of a data item in a plurality of different data items enabling a fair allocation of storage costs among users according to the effective storage space that each user is occupying.

Embodiments of the present invention provide methods and systems for verifying information of a data item in a plurality of different data items enabling account savings for users achieved by a deduplication of their files.

Embodiments of the present invention provide methods and systems for verifying information of data items in a plurality of different data items enabling the clients to prove a degree of deduplication of their files achieved in the cloud.

Embodiments of the present invention provide methods and systems for verifying information of a data item in a plurality of different data items reducing the total size of data needed to be uploaded for storage by users.

Embodiments of the present invention provide methods and systems for verifying information of data items in a plurality of different data items which is flexible and easy to implement.

According to an embodiment, a method for verifying information of data item in a plurality of different data items, preferably stored on a server like a cloud or the like, is characterized in that
a) a hash tree is generated from the plurality of data items, such that the data items forming the leaves of the hash tree and such that the non-leaf nodes are computed by hashing the data items of their respective child nodes and when computing the root-hash at least the distance between the root node and the leaf-nodes is included into the hashing,
b) an authentication path for said data item is computed based on a recomputation of the hash tree, wherein an authentication path comprises all siblings of tree nodes from the data item to the root of the hash tree,
c) the root-hash is recomputed based on said data item and the computed authentication path of said data item and the recomputed root-hash is compared with the root-hash of the hash-tree of step a),
d) the side element in the leaves or a tree level above of the hash tree and its authentication path is determined,
e) the authentication path of said side element is verified, wherein based on the result of step e) the number of data items of said plurality is determined and wherein a membership of said data item to the plurality of data items is determined based on the result of step c).

According to an embodiment, a system for verifying information of a data item in the plurality of different data items, preferably stored on a server like a cloud or the like, is characterized by a hashing entity adapted to generate a hash tree from the plurality of data items, such that the data items forming the leaves of the hash tree and such that the non-leaf nodes are computed by hashing the data items of their respective child nodes and when computing the root-hash at least the distance between the root node and the leaf-nodes is included into the hashing, authentication entity adapted to compute an authentication path for said data item based on a recomputation of the hash tree, wherein an authentication path comprises all siblings of tree nodes from the data item to the root of the hash tree, a recomputation entity adapted to recompute the root-hash based on said data item and the computed authentication path of said data item and comparing the recomputed root-hash with the root-hash of the hash-tree provided by said hashing entity, a determining entity adapted to determine the side element in the leaves or a tree level above of the hash tree and its authentication path, a verification entity adapted to verify the authentication path of said side element and a result providing entity adapted to determine based on a provided result of the verification entity the number of data items of said plurality and a membership of said data item to the plurality of data items based on a provided result of said recomputation entity.

The term "side element" can be understood as the element in the hash tree which is the right-most or the left-most element depending on the side from which the counting of data items is performed: If the position within the level of the leaves is counted from left to right, then the side element is the right-most element whereas when the position within the level is counted from right to left, then the side element is the left-most element when counted from the right.

According to embodiments of the invention it has been recognized that the information of a data item can be verified with an efficient proof of membership.

According to embodiments of the invention it has been further recognized that a cardinality of the data item in a plurality of different data items can be proved and provided.

According to embodiments of the invention it has been further recognized that in particular the total size of data can be reduced needed to be uploaded for storing on a server for example.

According to embodiments of the invention it has been even further recognized that in particular accounting information assigned to the data item can be verified.

According to embodiments of the invention it has been even further recognized that storage costs of users can be reduced without compromising the performance.

According to embodiments of the invention it has been even further recognized that storage costs savings for cloud users can be significantly reduced up to 30% when compared conventional commodity storage services for a number of realistic profiles of users.

According to embodiments of the invention it has been even further recognized that flexibility is significantly enhanced since the present invention can be applied in various fields: For example in cloud storage in particular shared or deduplicated slides, reputation systems where a score is computed based on a set of users who provided a rating, subscribers to services, for example publish or subscribe systems, mailing lists, kickstarter projects or the like, inventory of digital items and/or electronic voting.

According to embodiments of the invention it has been even further recognized that an easy implementation is provided.

According to embodiments of the invention it has been further recognized that the IDs of the users storing the same file within any time epoch, preferably maintained by a proxy entity, a gateway P or the like can be efficiently accumulated: Each user can check that his ID is correctly accumulated at billing time.

According to embodiments of the invention it has been even further recognized that the number of accumulated values can be encoded as well such that (i) any client can verify this number while (ii) it is not visible to outsiders.

According to a preferred embodiment when a number of leaves of the hash-tree formed by the data items compared with a required number to form a full hash-tree is lower, then further data items are used as leaves for compensation and are filed with a distinct data item. This allows in an easy way to complete any kind of hash-tree for example binary trees or the like. Thus flexibility is enhanced.

According to a further preferred embodiment the data items forming the leaves of the hash-tree are itself hash values of plaintext information. This enables to hide the information of the data items from the computing entity computing the hash-tree.

According to a further preferred embodiment the hash-tree is a binary tree, preferable a Merkle tree. The binary tree enables a fast and efficient hashing since every node comprises only maximum of two child nodes.

According to a further preferred embodiment the hash-tree is a tiger hash-tree with the hashing based on the tiger hash function. A tiger hash-tree is based on the crypto hash-function tiger and is preferably used to check the integrity of large data files during or after a transmission. The tiger tree hash hashes on the leave level preferably data blocks each having 1024 bytes.

According to a further preferred embodiment said plurality of data items is associated to a file with a file identification wherein said file identification is announced together with a root of the hash-tree. This allows an easy way to verify the information of the data item for every client which wants to store the file with the corresponding file FID.

According to a further preferred embodiment in case of different files each having a different file identification and associated to different pluralities of data items one or more of the files are randomly selected and steps a)-e) are performed for each data item in said corresponding plurality. This enables to keep the amount of data generated and transmitted small for verification since only a partial checking of selected files randomly is performed. For each of the selected file a proof of membership and the cardinality for each client is computed.

FIG. 1 shows a system for verifying information according to a first embodiment of the present invention. In FIG. 1 a proxy P is shown which receives requests from clients C when the client wants to upload a file to a storage provider SP.

The client C and the proxy entity or gateway P starts executing a proxy-aided key generation protocol for an encryption key. The client C then encrypts the file using an encryption algorithm with the encryption key. A root of a hash-tree is computed over the encrypted file and used as a file ID-FID-. The file ID is then associated with the file to be stored and when a plurality of users is associated to a file with a corresponding file ID FID then for example the clients may benefit from lower costs caused by a deduplication of files. Usually at the end of a predefined epoch the proxy P bills the clients C for the files held by them at any time during the epoch.

If a client C deletes a file during the epoch the proxy P still bills the user for this file and epoch and removes the marked client C from the list after computation of a corresponding bill. To provide a fair billing for example each client C is billed with a cost incurred by storing in the file F at the storage provider SP as a margin charged by the proxy P. Once every client C obtains the bill the proxy P starts the proving process to convince clients C of a file with FID that all clients C are billed in the same way. The clients C of a file F with file identification FID are convinced of their billing by creating a set of all clients C of said file and assuring that the size corresponds to the set of clients C of the file F, that all clients C are billed for a file being referenced to the same set of clients C and that a client C addressed is indeed part of that set of clients C. This information can be verified using an embodiment of the present invention: First step a) is performed with the data item being one of the clients, e.g. his Client ID and the plurality of different items being the set of clients C of a file. When the top or root-hash, preferably computed by the proxy P, is published among all clients C then each client C may check the number of clients C billed for a file F and the size of the set of clients C for a file F. Therefore the verified information, i.e. whether the client C belongs to the plurality of clients C associated to one file F and the number of clients C within said plurality can be verified using the steps a)-e) according to an embodiment of the present invention.

Figure 2:
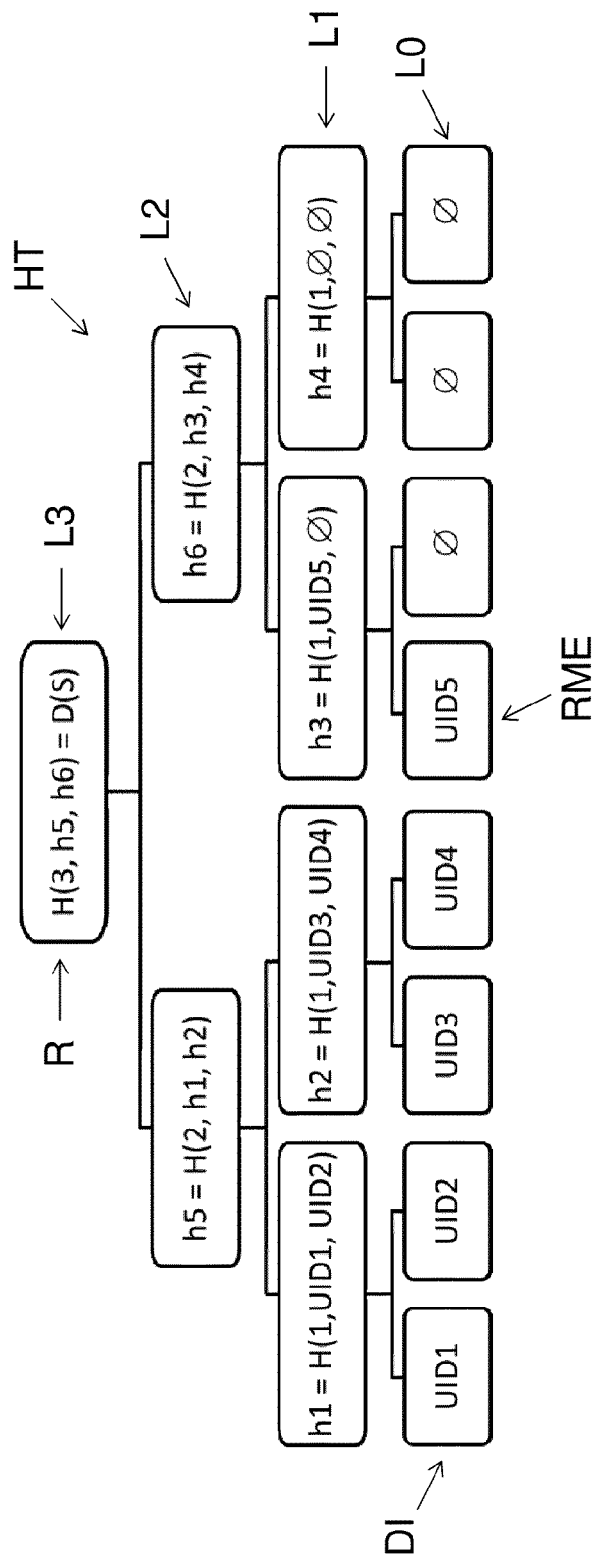
FIG. 2 shows a hash-tree according to a second embodiment of the present invention.

FIG. 2 shows a hash-tree according to a second embodiment of the present invention. In FIG. 2 a hash-tree according to an embodiment of the present invention is shown. This hash-tree is based on a Merkle tree HT with a cryptographic hash-function H. The Merkle tree HT is a binary tree HT where the data DI is put into the leaves of the tree. The non-leaf nodes are computed by computing the hash of their respective child nodes. A node of the tree is denoted by $a_{i,j}$ where i denotes the level L1, L2, L3 of the node and j the position of the node $a_{i,j}$ in said level L1, L2, L3. The levels L1, L2, L3 are counted as the distance to the level of the leaf nodes, with the leaf nodes thus being $a_{0,j}$. The position within a level L1, L2, L3 is counted from left to right, the leftmost node of a level thus being $a_{i,0}$. A standard Merkle tree HT is formed by $a_{i+1,j}=H(a_{i,2j};a_{i,2j+1})$.

In order to be able to verify the cardinality of the set, the computation of the Merkle tree HT is modified by including the level in the hash operation. Still, the data is put in the leaf nodes. The remaining empty nodes are filled with a distinct symbol 0.

Unlike the standard Merkle tree HT, the inner nodes are computed as:

$$a_{i+1,j}=H(i+1,a_{i,2j},a_{i,2j+1}).$$

The digest d that is output by a procedure Acc accumulating the set is given by the root of the tree $a_{3,0}$. This is visualized in FIG. 2.

A proving procedure ProveS(S;x) outputs a proof that the element/data item x is contained in the set S. To do so, the procedure recomputes the Merkle Tree HT as described above. A proof that x is contained as a leaf node is given as the authentication path for x, as in standard Merkle Trees HT. An authentication path consists of all siblings of nodes that are on the path from x to the root. The output px of the proving procedure is the element x and the authentication path for said element x.

The verification of the proof is performed with a verification procedure VerifyS(d;x; px) which recomputes the root element using x and the elements given in the authentication path and compares the obtained root element with the original digest d, i.e. the output of the procedure Acc.

To prove the cardinality of the set a procedure ProveC(S) is used. The proof pC comprises the rightmost element RNE $a_{0;|S|-1}$ and the authentication paths of that element as well as the path of the first 0 element. Given this information, the verifier can use a verification procedure VerifyC(d;c; p|S|) to confirm the cardinality c of the set S. The procedure checks that $a_{0,c-1}$ is indeed an nonempty element that is part of the set by verifying the authentication path. It then checks the right part of the hash tree HT which is possible, given the authentication path of the first 0 element, because the empty leaves are known to the verifier to be 0. This is efficiently possible with pre-computed inner nodes.

Figure 3:
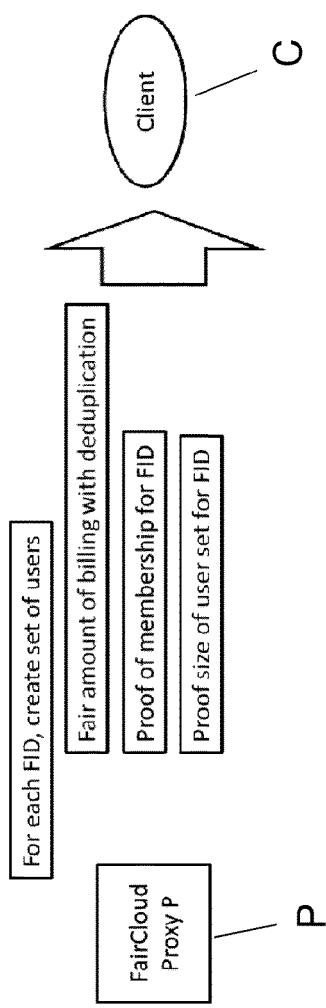
FIG. 3 shows a schematic view of a use case of a third embodiment of the present invention.

FIG. 3 shows a schematic view of a use case of a third embodiment of the present invention. In FIG. 3 a sketch of a billing process between the proxy P and a client is shown: The clients C first obtain bills stating the file with file identification FID associated to them and the cost charged for that file. After the bills are sent out to the clients C the proxy P may preferably obtains a random string for example using a GetRandomness procedure, that was provably unknown at the time of the creation of the bill. A random string of length n representing the number of clients can be used as a mask on the file identification FID to select with a probability the number of files whose file identification FID starts with this string. The proxy P will then for each selected file compute the proof-of-membership and the cardinality as information to be verified for each owner using steps a)-f) according to an embodiment of the present invention. To proxy P takes the set SF of the clients C associated with the file FID.

Therefore for each FID the set of users is created and the proxy P provides a proof-of-membership for the FID and the proof of the size of the user set for the corresponding FID enabling a client C to check whether he was fairly billed with deduplication of the file.

Embodiments of the present invention preferably provide a counting accumulator based on a cryptographic accumulator and added with the possibility to give a proof for the number of elements that are accumulated. This counting accumulator is tuple of procedures (Acc; ProveS; ProveC; VerifyS; VerifyC) where Acc(S)=d accumulates the set when this digest d is then committed to a set and publicly commit to set digest for example on a public bulletin board such that each client can verify billing.

The present invention has several applications in particular where accountability of statements about the set or group of users or elements has to be made. Used cases are:
  Cloud storage, in particular shared or deduplicated slides as described above
  Reputation systems, where a score is computed based on a set of users who provided a rating
  Subscribers to services (e.g. publish/subscribe systems, mailing lists, Kickstarter projects)
  Inventory of digital items
  Electronic Voting.

Embodiments of the present invention can enable reliance on a novel tree-based counting accumulator providing efficient proofs of membership and cardinality. Embodiments of the present invention can further enable a combination of the use of the counting accumulator with probabilistic methods based on external randomness in order to reduce the total size of data needed to be uploaded on the public bulletin board to enable bill verification.

According to an embodiment, a method is provided comprising the steps of generating a counting accumulator providing a proof-of-membership and cardinality, publishing on a public bulletin board an association between a chosen file with file identification FID and a digest of the accumulator, preferably the root of a hash-tree of the accumulator and sending proof-of-membership and cardinality information for each client subscribed to the chosen file identification FID. To reduce the work load after generation of the counting accumulator and prior to publish the association committing to a given bill sent to each user/client may be performed and/or using external randomness to sample which file identification FID to prove.

Embodiments of the present invention can further enable a probabilistic procedure which selectively reveals details about a number of file accumulators in each epoch. If the gateway/proxy could make the selection on his own, he could easily cheat by creating only correct bills for the selected files while overcharging the clients registered to the remaining files. There, the selection procedure is seeded by a trusted external source of pseudorandomness which is preferably based on a virtual currency like Bitcoin. It ensures that any client can check that the selection has been done correctly. Moreover, as this source is unpredictable, using it does not give any advantage for the gateway/proxy entity P to misbehave.

Embodiments of present invention may have, inter alia, the following advantages: protection against attempts to overcharge users, more flexibility and transparency from the perspective of users and storage providers, cheaper storage costs than conventional storage services, and when combined with encryption, without compromising the confidentiality of data. Further the performance is not significantly reduced: The overhead incurred on the proxy in orchestrating for example data deduplication is minimal and a tolerable overhead on the users is enabled when verifying their bills at the end of every epoch.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for verifying information of a first data item in a plurality of different data items stored on a server, the method comprising:
   a) generating a hash tree from the plurality of different data items, such that the plurality of different data items form leaves of the hash tree and such that non-leaf nodes are computed by hashing data items of their respective child nodes, wherein the generating a hash tree includes computing a root-hash of a root node of the hash tree using a hashing operation, wherein at least a distance between the root node and leaf nodes is included in the hashing operation, and wherein when a number of leaves of the hash tree formed by the plurality of different data items is less than a required number to form a full hash tree, one or more additional leaves are used for compensation and the one or more additional leaves are filled with a same distinct data item,
   b) computing an authentication path for the first data item based on a recomputation of the hash tree, wherein the authentication path comprises all siblings of tree nodes from the first data item to the root node of the hash tree,
   c) recomputing the root-hash based on the first data item and the computed authentication path of the first data item and comparing the recomputed root-hash with the root-hash of the root node of the hash-tree computed in step a),
   d) determining a side element in leaves or a tree level above of the hash tree and an authentication path of the side element,
   e) verifying the authentication path of the side element, f) determining, based on the result of step e), and based on a number of the same distinct data items, a number of data items of the plurality of different data items, and g) determining a membership of the first data item to the plurality of different data items based on the result of step c).

2. The method according to claim 1, wherein data items forming leaves of the hash tree are hash values of plaintext information.

3. The method according to claim 1, wherein the hash tree is a binary tree.

4. The method according to claim 1, wherein the hash tree is a Tiger hash-tree with the hashing based on a tiger hash function.

5. The method according to claim 1, wherein the plurality of different data items is associated to a file with a file identification, wherein the file identification is announced together with the root of the hash tree.

6. The method according to claim 5, wherein for different files each having a different file identification and associated to different pluralities of data items one or more files are randomly selected and steps a)-e) are performed for each data item in the corresponding plurality of data items.

7. A system connectable to a storage entity and one or more clients configured to verify information of a first data item in a plurality of different data items, the system comprising:

a hashing entity adapted to generate a hash tree from the plurality of different data items, such that the plurality of different data items form leaves of the hash tree and such that non-leaf nodes are computed by hashing data items of their respective child nodes, wherein generation of the hash tree includes computing a root-hash of a root node of the hash tree using a hashing operation, wherein at least a distance between the root node and leaf nodes is included in the hashing operation, and wherein when a number of leaves of the hash tree formed by the plurality of different data items is less than a required number to form a full hash tree, one or more additional leaves are used for compensation and the one or more additional leaves are filled with a same distinct data item, an authentication entity adapted to compute an authentication path for the first data item based on a recomputation of the hash tree, wherein the authentication path comprises all siblings of tree nodes from the first data item to the root node of the hash tree, a recomputation entity adapted to recompute the root-hash based on the first data item and the computed authentication path of the first data item and to compare the recomputed root-hash with the root-hash of the root node of the hash-tree provided by the hashing entity, a determining entity adapted to determine a side element in leaves or a tree level above of the hash tree and an authentication path of the side element, a verification entity adapted to verify the authentication path of the side element, and a result providing entity adapted to determine, based on a provided result of the verification entity, and based on a number of the same distinct data items, a number of data items of the plurality of different data items and a membership of the first data item to the plurality of data items based on a provided result of the recomputation entity.

8. The system according to claim 7, wherein empty leaf nodes of the hash tree are filled with a distinct symbol 0.

9. The method according to claim 1, wherein empty leaf nodes of the hash tree are filled with a distinct symbol 0.

* * * * *